(12) United States Patent
Chase et al.

(10) Patent No.: US 10,787,303 B2
(45) Date of Patent: *Sep. 29, 2020

(54) PACKAGING INSULATION PRODUCTS AND METHODS OF MAKING AND USING SAME

(71) Applicant: Cellulose Material Solutions, LLC, Jenison, MI (US)

(72) Inventors: Kevin Chase, Hudsonville, MI (US); Brandon Fenske, Grand Rapids, MI (US); Christopher Benner, Ada, MI (US); Matthew Henderson, Jenison, MI (US)

(73) Assignee: Cellulose Material Solutions, LLC, Jenison, MI (US)

(*) Notice: Subject to any disclaimer, the term of this patent is extended or adjusted under 35 U.S.C. 154(b) by 125 days.

This patent is subject to a terminal disclaimer.

(21) Appl. No.: 15/168,064

(22) Filed: May 29, 2016

(65) Prior Publication Data

US 2017/0341847 A1 Nov. 30, 2017

(51) Int. Cl.
*B65D 81/38* (2006.01)
(52) U.S. Cl.
CPC .................................. *B65D 81/386* (2013.01)
(58) Field of Classification Search
CPC .......................... B65D 81/3813; B65D 5/603
USPC ..................................................... 229/103.11
See application file for complete search history.

(56) References Cited

U.S. PATENT DOCUMENTS

| 3,222,243 | A | 12/1965 | Gaston et al. |
| 3,461,026 | A | 8/1969 | Schick |
| 3,952,073 | A | 4/1976 | Isaka et al. |
| 3,964,235 | A | 6/1976 | Miller et al. |
| 3,987,752 | A | 10/1976 | Miller |
| 4,035,216 | A | 7/1977 | Immel |
| 4,040,847 | A | 8/1977 | Miller |
| 4,045,515 | A | 8/1977 | Isaka et al. |
| 4,083,490 | A | 4/1978 | Cunningham et al. |
| 4,094,130 | A | 6/1978 | Kelly et al. |
| 4,099,363 | A | 7/1978 | Wistinghausen et al. |
| 4,111,828 | A | 9/1978 | Wang |
| 4,172,749 | A | 10/1979 | Liggett |
| 4,210,530 | A | 7/1980 | Etzel et al. |
| 4,235,060 | A | 11/1980 | Wang et al. |

(Continued)

FOREIGN PATENT DOCUMENTS

| WO | 0210524 | 2/2002 |
| WO | 2011143664 | 11/2011 |

OTHER PUBLICATIONS

Thermopod, Pie and Cake Shipper, www.thermopodllc.com/piecakeshipper.html.

(Continued)

*Primary Examiner* — Derek J Battisti
(74) *Attorney, Agent, or Firm* — Mitchell Intellectual Property Law, PLLC (57) ABSTRACT

Packaging insulation for insertion into a packaging container, which includes an air laid natural fibrous batt comprised primarily of natural fibers, having foldable paper sheet material adhered to both sides of the batt. The resulting method and product provides packaging insulation which can be shipped flat and compressed, which expands when unpacked and which can be readily folded to match the interior configuration of a shipping container, such as a cardboard box.

21 Claims, 3 Drawing Sheets

(56) References Cited

U.S. PATENT DOCUMENTS

| | | |
|---|---|---|
| 4,337,666 A | 7/1982 | Bhattacharyya et al. |
| 4,341,003 A | 7/1982 | Kopena |
| 4,387,021 A | 6/1983 | Davis et al. |
| 4,388,056 A * | 6/1983 | Lee .................. A61F 13/15658 |
| | | 425/83.1 |
| 4,427,153 A | 1/1984 | Schaefer |
| 4,452,848 A | 6/1984 | Geiger |
| 4,456,208 A | 6/1984 | MacConochie et al. |
| 4,495,119 A * | 1/1985 | Chung .................. B27N 3/14 |
| | | 264/121 |
| 4,501,107 A | 2/1985 | Piotrowski |
| 4,550,550 A | 11/1985 | Scott |
| 4,622,346 A | 11/1986 | DiGiulio |
| 4,626,554 A | 12/1986 | DiGiulio |
| 4,652,609 A | 3/1987 | DiGiulio |
| 4,653,397 A | 3/1987 | Gray et al. |
| 4,654,375 A | 3/1987 | Malwitz |
| 4,659,600 A | 4/1987 | DiGiulio |
| 4,659,745 A | 4/1987 | DiGiulio |
| 4,661,386 A | 4/1987 | DiGiulio |
| 4,661,564 A | 4/1987 | DiGiulio |
| 4,665,103 A | 5/1987 | DiGiulio |
| 4,670,513 A | 6/1987 | DiGiulio |
| 4,675,363 A | 6/1987 | DiGiulio |
| 4,679,122 A | 7/1987 | Belke, Jr. et al. |
| 4,686,240 A | 8/1987 | Bailey, Jr. et al. |
| 4,701,474 A | 10/1987 | Bailey, Jr. et al. |
| 4,767,108 A | 7/1988 | Walisser |
| 4,762,229 A | 8/1988 | Wickre |
| 4,794,358 A | 12/1988 | Steingroever et al. |
| 4,797,010 A | 1/1989 | Coelho |
| 4,890,166 A | 12/1989 | Miyagawa et al. |
| 4,896,476 A | 1/1990 | Harris |
| 4,952,441 A | 8/1990 | Bose et al. |
| 5,001,017 A | 3/1991 | Alhamad et al. |
| 5,004,159 A | 4/1991 | Kistner |
| 5,005,765 A | 4/1991 | Kistner |
| 5,051,452 A | 9/1991 | Romesberg |
| 5,060,370 A | 10/1991 | Scales, Jr. et al. |
| 5,094,776 A | 3/1992 | Bailey, Jr. |
| 5,095,054 A | 3/1992 | Lay et al. |
| 5,095,597 A | 3/1992 | Alhamad et al. |
| 5,097,907 A | 3/1992 | Alhamad et al. |
| 5,113,892 A | 5/1992 | Hull et al. |
| 5,112,462 A | 6/1992 | Swisher |
| 5,118,555 A | 6/1992 | Horovitz |
| 5,133,834 A | 7/1992 | Capps |
| 5,137,791 A | 8/1992 | Swisher |
| 5,142,755 A | 9/1992 | Alhamad et al. |
| 5,206,082 A | 4/1993 | Malone |
| 5,207,756 A | 5/1993 | Alhamad et al. |
| 5,226,269 A | 7/1993 | Stoltenberg |
| 5,226,557 A | 7/1993 | Nelson |
| 5,242,115 A | 9/1993 | Brown |
| 5,288,764 A | 2/1994 | Rotter et al. |
| 5,297,416 A | 3/1994 | Alhamad et al. |
| 5,308,560 A | 5/1994 | Bibby et al. |
| 5,322,181 A | 6/1994 | Nelson |
| 5,340,846 A | 8/1994 | Rotter et al. |
| 5,350,063 A | 9/1994 | Berdan, II |
| 5,360,848 A | 11/1994 | Kuechler et al. |
| 5,364,707 A | 11/1994 | Swisher |
| 5,366,594 A | 11/1994 | Capps |
| 5,373,028 A | 12/1994 | McAfee et al. |
| 5,374,914 A | 12/1994 | Prueitt |
| 5,402,852 A | 4/1995 | Alhamad et al. |
| 5,418,031 A * | 5/1995 | English .................. B32B 27/12 |
| | | 428/74 |
| 5,414,200 A | 6/1995 | Mouk et al. |
| 5,429,308 A | 7/1995 | Brown |
| 5,431,992 A | 7/1995 | Houpt et al. |
| 5,446,111 A | 8/1995 | Rotter et al. |
| 5,466,504 A | 11/1995 | Gavin et al. |
| 5,470,890 A | 11/1995 | House et al. |
| 5,480,730 A | 1/1996 | Swisher |
| 5,497,627 A | 3/1996 | Heyduk et al. |
| 5,510,419 A | 4/1996 | Burgoyne et al. |
| 5,512,346 A | 4/1996 | Johnson |
| 5,516,580 A * | 5/1996 | Frenette .................. D04H 1/54 |
| | | 428/359 |
| 5,525,278 A | 6/1996 | Krosch et al. |
| 5,536,550 A | 7/1996 | Houpt et al. |
| 5,536,793 A | 7/1996 | Rotter et al. |
| 5,554,238 A | 9/1996 | English |
| 5,556,926 A | 9/1996 | Rotter et al. |
| 5,559,278 A | 9/1996 | Mouk et al. |
| 5,575,339 A | 11/1996 | Alhamad |
| 5,582,905 A * | 12/1996 | Beck .................. B32B 5/26 |
| | | 428/74 |
| 5,602,295 A | 2/1997 | Abel et al. |
| 5,616,821 A | 4/1997 | Mouk et al. |
| 5,618,327 A | 4/1997 | Aschenbeck et al. |
| 5,620,497 A | 4/1997 | Aschenbeck et al. |
| 5,620,664 A | 4/1997 | Palmer |
| 5,629,089 A | 5/1997 | Berdan, II et al. |
| 5,642,601 A | 7/1997 | Thompson, Jr. et al. |
| 5,646,908 A | 7/1997 | Aschenbeck et al. |
| 5,647,883 A | 7/1997 | Houpt et al. |
| 5,672,414 A | 9/1997 | Okamoto et al. |
| 5,672,429 A | 9/1997 | Berdan, II et al. |
| 5,678,231 A | 10/1997 | Mouk et al. |
| 5,688,578 A * | 11/1997 | Goodrich .................. B21D 31/04 |
| | | 206/521 |
| 5,698,750 A | 12/1997 | Mouk et al. |
| 5,723,216 A | 3/1998 | Houpt et al. |
| 5,733,478 A | 3/1998 | Creech et al. |
| 5,738,175 A | 4/1998 | Alhamad |
| 5,743,932 A | 4/1998 | Houpt et al. |
| 5,765,861 A | 5/1998 | Scott et al. |
| 5,770,300 A | 6/1998 | Okamoto et al. |
| 5,770,309 A | 6/1998 | Houpt et al. |
| 5,805,431 A | 9/1998 | Josh et al. |
| 5,816,332 A | 10/1998 | Alhamad |
| 5,821,605 A | 10/1998 | Hong et al. |
| 5,832,696 A | 11/1998 | Nagy et al. |
| 5,843,764 A | 12/1998 | Woodward |
| 5,849,131 A | 12/1998 | Shaffer et al. |
| 5,883,330 A | 3/1999 | Yoshida |
| 5,894,127 A | 4/1999 | Dando et al. |
| 5,916,393 A | 6/1999 | Shaffer et al. |
| 5,930,117 A | 7/1999 | Gengel |
| 5,998,877 A | 12/1999 | Ohuchi |
| 6,033,769 A | 3/2000 | Brueggemann et al. |
| 6,060,175 A | 5/2000 | Swisher |
| 6,062,316 A | 5/2000 | Alhamad |
| 6,066,887 A | 5/2000 | Hong et al. |
| 6,089,325 A | 7/2000 | Alhamad |
| 6,117,062 A | 9/2000 | Alhamad |
| 6,136,878 A | 10/2000 | Free et al. |
| 6,187,615 B1 | 2/2001 | Kim et al. |
| 6,189,344 B1 | 2/2001 | Aschenbeck et al. |
| 6,191,057 B1 * | 2/2001 | Patel .................. B32B 27/06 |
| | | 442/398 |
| 6,221,478 B1 | 4/2001 | Kammeyer |
| 6,221,925 B1 | 4/2001 | Constant et al. |
| 6,239,187 B1 | 5/2001 | Hatke et al. |
| 6,321,507 B1 | 11/2001 | Copeland et al. |
| 6,345,776 B1 | 2/2002 | Hurray et al. |
| 6,349,774 B2 | 2/2002 | Alhamad |
| 6,373,294 B1 | 4/2002 | Bentley |
| 6,375,096 B1 | 4/2002 | Rashidi |
| 6,388,404 B1 | 5/2002 | Schnebly et al. |
| 6,393,807 B1 | 5/2002 | Tipton et al. |
| 6,397,566 B1 | 6/2002 | Tipton et al. |
| 6,401,438 B2 | 6/2002 | Tipton et al. |
| 6,407,225 B1 | 6/2002 | Mang et al. |
| 6,471,061 B1 | 10/2002 | Teague et al. |
| 6,476,465 B2 | 11/2002 | Hirose |
| 6,476,481 B2 | 11/2002 | Woodworth et al. |
| 6,483,186 B1 | 11/2002 | Hsieh et al. |
| 6,502,373 B1 | 1/2003 | Tipton et al. |
| 6,521,979 B1 | 2/2003 | You |
| 6,527,203 B2 | 3/2003 | Hurray et al. |
| 6,528,443 B1 | 3/2003 | Healy |

(56) References Cited

U.S. PATENT DOCUMENTS

| | | |
|---|---|---|
| 6,555,491 B1 | 4/2003 | Healy |
| 6,562,173 B1 | 5/2003 | Collison |
| 6,566,783 B2 | 5/2003 | Hatz et al. |
| 6,570,459 B1 | 6/2003 | Nathanson et al. |
| 6,667,547 B2 | 12/2003 | Woodworth et al. |
| 6,674,255 B2 | 1/2004 | Schnebly et al. |
| 6,688,757 B2 | 2/2004 | Kovach et al. |
| 6,699,563 B1 | 3/2004 | Alhamad |
| 6,710,494 B2 | 3/2004 | Hatz et al. |
| 6,737,775 B2 | 5/2004 | Hatz et al. |
| 6,759,446 B2 | 7/2004 | Lee et al. |
| 6,809,937 B2 | 10/2004 | Augustin et al. |
| 6,815,380 B2 * | 11/2004 | Snyder .................... B32B 17/02 442/180 |
| 6,821,131 B2 | 11/2004 | Suzuki et al. |
| 6,840,462 B2 | 1/2005 | Hurray et al. |
| 6,861,821 B2 | 3/2005 | Masumoto et al. |
| 6,875,486 B2 * | 4/2005 | Miller .................... B65D 81/18 428/34.1 |
| 6,875,637 B2 | 4/2005 | Yoshino et al. |
| 6,894,374 B2 | 5/2005 | Yoshino et al. |
| 6,900,537 B2 | 5/2005 | Sridevan |
| 6,931,823 B2 | 8/2005 | Forte et al. |
| 6,943,433 B2 | 9/2005 | Kamada |
| 6,986,229 B2 | 1/2006 | Collison |
| 7,026,365 B2 | 4/2006 | Lee et al. |
| 7,026,636 B2 | 4/2006 | Rangwalla et al. |
| 7,046,584 B2 | 5/2006 | Sorrells et al. |
| 7,060,148 B2 | 6/2006 | Toas et al. |
| 7,070,831 B2 | 7/2006 | You |
| 7,077,634 B2 | 7/2006 | Munch et al. |
| 7,080,545 B2 | 7/2006 | Dimeo, Jr. et al. |
| 7,094,192 B2 | 8/2006 | Schoenberger et al. |
| 7,185,423 B2 | 3/2007 | Augustin et al. |
| 7,201,012 B2 | 4/2007 | Munch et al. |
| 7,201,214 B2 | 4/2007 | Munch et al. |
| 7,229,677 B2 | 6/2007 | Miller |
| 7,243,479 B2 | 7/2007 | Allwein |
| 7,243,484 B2 | 7/2007 | Allwein |
| 7,250,205 B1 | 7/2007 | Suda et al. |
| 7,278,549 B2 | 10/2007 | Munch et al. |
| 7,281,622 B2 | 10/2007 | Qi |
| 7,296,460 B2 | 11/2007 | Dimeo, Jr. et al. |
| 7,297,384 B2 | 11/2007 | Crowley |
| 7,334,384 B2 | 2/2008 | Nissen |
| 7,344,363 B2 | 3/2008 | Munch et al. |
| 7,348,580 B2 | 3/2008 | Rangwalla et al. |
| 7,365,292 B2 | 4/2008 | Cole et al. |
| RE40,380 E | 6/2008 | Forte et al. |
| 7,402,029 B2 | 7/2008 | Munch et al. |
| 7,409,813 B2 | 8/2008 | Qi et al. |
| 7,448,494 B2 | 11/2008 | LaSalle |
| 7,449,232 B2 | 11/2008 | Rangwalla |
| 7,453,153 B2 | 11/2008 | Saita et al. |
| 7,458,235 B2 | 12/2008 | Beaufils et al. |
| 7,461,496 B2 | 12/2008 | Hasselbach et al. |
| 7,472,551 B2 | 1/2009 | May |
| 7,475,588 B2 | 1/2009 | Dimeo, Jr. et al. |
| 7,509,788 B2 | 3/2009 | Hasselbach et al. |
| 7,525,238 B2 | 4/2009 | Kubler et al. |
| 7,531,703 B2 | 5/2009 | Ramesh et al. |
| 7,541,562 B2 | 6/2009 | Cole et al. |
| 7,579,628 B2 | 8/2009 | Inoguchi |
| 7,627,828 B1 | 12/2009 | Collison et al. |
| 7,658,989 B2 | 2/2010 | DeSimone et al. |
| 7,674,657 B2 | 3/2010 | Heng et al. |
| 7,733,107 B1 | 6/2010 | Barth et al. |
| 7,775,814 B1 | 8/2010 | Bhutani |
| 7,785,694 B2 | 8/2010 | Muller et al. |
| 7,807,313 B2 | 10/2010 | Kaye et al. |
| 7,820,069 B2 | 10/2010 | Gosselin |
| 7,846,987 B2 | 12/2010 | Handa |
| 7,859,115 B2 | 12/2010 | Kim et al. |
| 7,883,056 B2 | 2/2011 | Mueller et al. |
| 7,892,448 B2 | 2/2011 | Gosselin |
| 7,906,561 B2 | 3/2011 | Hu et al. |
| 7,918,062 B2 | 4/2011 | Chen |
| 7,938,054 B2 | 5/2011 | Eom et al. |
| 7,975,905 B2 * | 7/2011 | Humphries .............. B32B 3/12 220/495.01 |
| 7,977,689 B2 | 7/2011 | Inoguchi |
| 8,018,043 B2 | 9/2011 | Suh et al. |
| 8,026,291 B2 | 9/2011 | Handa et al. |
| 8,026,584 B2 | 9/2011 | Kim |
| 8,049,332 B2 | 11/2011 | Oh et al. |
| 8,053,049 B2 | 11/2011 | Ruid et al. |
| 8,092,689 B2 | 1/2012 | Gosselin |
| 8,109,130 B2 | 2/2012 | Dimeo, Jr. et al. |
| 8,125,086 B2 | 2/2012 | Jung et al. |
| 8,173,219 B2 | 5/2012 | Tutin et al. |
| 8,179,669 B2 | 5/2012 | Huang |
| 8,173,464 B2 | 6/2012 | Kim et al. |
| 8,198,187 B2 | 6/2012 | Ohno |
| 8,209,929 B2 | 7/2012 | Collison |
| 8,216,898 B2 | 7/2012 | Chen et al. |
| 8,228,033 B2 | 7/2012 | Koefinger et al. |
| 8,247,480 B2 | 8/2012 | Kaytan |
| 8,298,865 B2 | 10/2012 | Jung et al. |
| 8,299,591 B2 | 10/2012 | Oh et al. |
| 8,309,619 B2 | 11/2012 | Handa et al. |
| 8,341,910 B2 | 1/2013 | Collison |
| 8,341,911 B2 | 1/2013 | Collison |
| 8,365,488 B2 | 2/2013 | Chen |
| 8,384,202 B2 | 2/2013 | Hoashi et al. |
| 8,424,262 B2 | 4/2013 | Deblander et al. |
| 8,440,275 B2 | 5/2013 | Cole et al. |
| 8,440,280 B2 | 5/2013 | Ronzani |
| 8,531,254 B2 | 9/2013 | Yamaji et al. |
| 8,587,185 B2 | 11/2013 | Negley et al. |
| 8,598,244 B2 | 12/2013 | Handa et al. |
| 8,604,659 B2 | 12/2013 | Rieker et al. |
| 8,614,154 B2 * | 12/2013 | Andersen ............... D04H 1/425 428/359 |
| 8,618,656 B2 | 12/2013 | Oh et al. |
| 8,703,835 B2 | 4/2014 | Handa et al. |
| 8,727,281 B2 | 5/2014 | Muller et al. |
| 8,749,049 B2 | 6/2014 | Mo |
| 8,784,946 B2 | 7/2014 | Rangwalla |
| 8,795,470 B2 | 8/2014 | Henderson et al. |
| 8,823,158 B2 | 9/2014 | Oh et al. |
| 8,828,510 B2 | 9/2014 | Cole et al. |
| 8,847,377 B2 | 9/2014 | Kim et al. |
| 8,872,319 B2 | 10/2014 | Kim et al. |
| 8,882,041 B2 | 11/2014 | Mueller et al. |
| 8,938,925 B2 | 1/2015 | Collison |
| 8,941,064 B2 | 1/2015 | Akin et al. |
| 8,987,064 B2 | 3/2015 | Do et al. |
| 9,056,410 B2 | 6/2015 | Burke et al. |
| 9,062,179 B2 | 6/2015 | Kim et al. |
| 9,070,691 B2 | 6/2015 | Oh et al. |
| 9,079,197 B2 | 7/2015 | Bina et al. |
| 9,136,215 B2 | 9/2015 | Lim et al. |
| 9,168,718 B2 | 10/2015 | Westwood et al. |
| 9,174,363 B2 | 11/2015 | Paetz-Lauter et al. |
| 9,206,909 B2 | 12/2015 | Collison et al. |
| 9,211,552 B2 | 12/2015 | Gantenbein et al. |
| 9,217,253 B2 | 12/2015 | Collison |
| 9,233,385 B2 | 1/2016 | Gantenbein et al. |
| 9,273,836 B2 | 3/2016 | Negley et al. |
| 2001/0005977 A1 | 7/2001 | Tipton et al. |
| 2001/0005978 A1 | 7/2001 | Tipton et al. |
| 2001/0031339 A1 | 10/2001 | Johnson |
| 2001/0045626 A1 | 11/2001 | Hirose |
| 2001/0054752 A1 | 12/2001 | Woodworth et al. |
| 2002/0038826 A1 | 4/2002 | Hurray et al. |
| 2002/0093297 A1 | 7/2002 | Schnebly et al. |
| 2002/0130200 A1 | 9/2002 | Hurray et al. |
| 2002/0136887 A1 | 9/2002 | Penneau et al. |
| 2002/0153791 A1 | 10/2002 | Hatz et al. |
| 2002/0153793 A1 | 10/2002 | Hatz et al. |
| 2002/0153798 A1 | 10/2002 | Hatz et al. |
| 2002/0168509 A1 | 11/2002 | DeSimone et al. |
| 2003/0001108 A1 | 1/2003 | Rangwalla et al. |
| 2003/0011051 A1 | 1/2003 | Woodworth et al. |

(56) References Cited

U.S. PATENT DOCUMENTS

| | | |
|---|---|---|
| 2003/0017653 A1 | 1/2003 | Yoshino et al. |
| 2003/0076668 A1 | 4/2003 | Kovach et al. |
| 2003/0093897 A1 | 5/2003 | Augustin et al. |
| 2003/0102548 A1 | 6/2003 | You |
| 2003/0131935 A1 | 7/2003 | Dyne |
| 2003/0131936 A1 | 7/2003 | Dyne |
| 2003/0157314 A1 | 8/2003 | Penneau et al. |
| 2003/0168720 A1 | 9/2003 | Kamada |
| 2003/0180582 A1 | 9/2003 | Masumoto et al. |
| 2003/0205832 A1 | 11/2003 | Lee et al. |
| 2004/0016212 A1 | 1/2004 | Miller |
| 2004/0018340 A1 | 1/2004 | Alhamad |
| 2004/0067182 A1 | 4/2004 | Kelly et al. |
| 2004/0070068 A1 | 4/2004 | Yoshino et al. |
| 2004/0074285 A1 | 4/2004 | Dimeo, Jr. et al. |
| 2004/0081727 A1 | 4/2004 | Miller et al. |
| 2004/0089820 A1 | 5/2004 | Rangwalla et al. |
| 2004/0094980 A1 | 5/2004 | Armbrust et al. |
| 2004/0104449 A1 | 6/2004 | Yoon et al. |
| 2004/0112093 A1 | 6/2004 | Beaufils et al. |
| 2004/0130021 A1 | 7/2004 | Sridevan |
| 2004/0137767 A1 | 7/2004 | Suzuki et al. |
| 2004/0148959 A1 | 8/2004 | Munch et al. |
| 2005/0004243 A1 | 1/2005 | Lee et al. |
| 2005/0007887 A1 | 1/2005 | Sorrells et al. |
| 2005/0022375 A1 | 2/2005 | Augustin et al. |
| 2005/0044815 A1 | 3/2005 | Forte et al. |
| 2005/0058790 A1 | 3/2005 | Simon et al. |
| 2005/0070617 A1 | 3/2005 | Harfmann |
| 2005/0158521 A1 | 7/2005 | Sanyal |
| 2005/0170726 A1 | 8/2005 | Brunson et al. |
| 2005/0173060 A1 | 8/2005 | Toas et al. |
| 2005/0183443 A1 | 8/2005 | Munch et al. |
| 2005/0183444 A1 | 8/2005 | Munch et al. |
| 2005/0183445 A1 | 8/2005 | Munch et al. |
| 2005/0183845 A1 | 8/2005 | Munch et al. |
| 2005/0199496 A1 | 9/2005 | Dimeo, Jr. et al. |
| 2005/0205424 A1 | 9/2005 | Dimeo, Jr. et al. |
| 2005/0205565 A1 | 9/2005 | Cole et al. |
| 2005/0210913 A1 | 9/2005 | Munch et al. |
| 2005/0214512 A1 | 9/2005 | Fascio |
| 2005/0230258 A1 | 10/2005 | Dimeo, Jr. et al. |
| 2005/0233121 A1 | 10/2005 | Rangwalla |
| 2005/0249910 A1* | 11/2005 | Campal .................. B32B 19/02 428/55 |
| 2005/0260368 A1 | 11/2005 | Ruid et al. |
| 2005/0260383 A1 | 11/2005 | Alhamad |
| 2006/0003057 A1 | 1/2006 | Kelly et al. |
| 2006/0052466 A1 | 3/2006 | Handa |
| 2006/0059852 A1 | 3/2006 | Toas et al. |
| 2006/0074372 A1 | 4/2006 | Haga et al. |
| 2006/0083281 A1 | 4/2006 | Inoguchi |
| 2006/0134470 A1 | 6/2006 | Kaye et al. |
| 2006/0147696 A1 | 7/2006 | Crowley |
| 2006/0211782 A1 | 9/2006 | Handa et al. |
| 2006/0238961 A1 | 10/2006 | Saita et al. |
| 2006/0261304 A1 | 11/2006 | Muthukumaran et al. |
| 2006/0270761 A1 | 11/2006 | Gosselin |
| 2006/0284014 A1 | 12/2006 | Muller et al. |
| 2006/0286325 A1 | 12/2006 | Swoboda et al. |
| 2006/0288661 A1 | 12/2006 | Allwein |
| 2007/0001564 A1 | 1/2007 | Park |
| 2007/0003733 A1 | 1/2007 | Muller |
| 2007/0018042 A1 | 1/2007 | Muller et al. |
| 2007/0036961 A1 | 2/2007 | LaSalle |
| 2007/0045567 A1 | 3/2007 | Rangwalla et al. |
| 2007/0083068 A1 | 4/2007 | Ramesh et al. |
| 2007/0095022 A1 | 5/2007 | Nissen |
| 2007/0107386 A1 | 5/2007 | Allwein |
| 2007/0157565 A1 | 7/2007 | Qi et al. |
| 2007/0180797 A1 | 8/2007 | Hasselbach et al. |
| 2007/0193224 A1 | 8/2007 | Hasselbach et al. |
| 2007/0195852 A1 | 8/2007 | Clark et al. |
| 2007/0199800 A1 | 8/2007 | Qi |
| 2007/0208094 A1 | 9/2007 | Handa et al. |
| 2007/0213416 A1 | 9/2007 | Handa et al. |
| 2007/0228396 A1 | 10/2007 | Sumitani |
| 2007/0232707 A1 | 10/2007 | Benitsch et al. |
| 2007/0283648 A1 | 12/2007 | Chen |
| 2007/0293593 A1 | 12/2007 | Harfmann |
| 2008/0014402 A1 | 1/2008 | Tomith |
| 2008/0032077 A1 | 2/2008 | Crowley |
| 2008/0032114 A1 | 2/2008 | Squires et al. |
| 2008/0047958 A1 | 2/2008 | Cole et al. |
| 2008/0081095 A1 | 4/2008 | Cole et al. |
| 2008/0110203 A1 | 5/2008 | May |
| 2008/0115460 A1 | 5/2008 | Ruid et al. |
| 2008/0121836 A1 | 5/2008 | Bowman et al. |
| 2008/0136110 A1 | 6/2008 | He |
| 2008/0138526 A1 | 6/2008 | Tutin et al. |
| 2008/0142380 A1 | 6/2008 | Unruh et al. |
| 2008/0146686 A1 | 6/2008 | Handa |
| 2008/0157433 A1 | 7/2008 | Heng et al. |
| 2008/0163565 A1 | 7/2008 | Toas |
| 2008/0164619 A1 | 7/2008 | Lee et al. |
| 2008/0190119 A1 | 8/2008 | Smayling |
| 2008/0203854 A1 | 8/2008 | Kubler et al. |
| 2008/0263997 A1 | 10/2008 | Kinne et al. |
| 2008/0265410 A1 | 10/2008 | Chang et al. |
| 2008/0281009 A1 | 11/2008 | He et al. |
| 2008/0281010 A1 | 11/2008 | Lefas et al. |
| 2009/0035479 A1 | 2/2009 | Rangwalla |
| 2009/0044928 A1 | 2/2009 | Upadhya et al. |
| 2009/0102037 A1 | 4/2009 | Kim |
| 2009/0130377 A1 | 5/2009 | Samanta et al. |
| 2009/0166836 A1 | 7/2009 | Kim et al. |
| 2009/0166892 A1 | 7/2009 | Lee |
| 2009/0174044 A1 | 7/2009 | Eom et al. |
| 2009/0193761 A1 | 8/2009 | Hasselbach et al. |
| 2009/0224392 A1 | 9/2009 | Suh et al. |
| 2009/0230138 A1 | 9/2009 | Williams et al. |
| 2009/0230244 A1 | 9/2009 | Kofinger et al. |
| 2009/0278155 A1 | 11/2009 | Inoguchi |
| 2009/0294972 A1 | 12/2009 | Jung et al. |
| 2009/0304999 A1 | 12/2009 | Fascio |
| 2009/0305427 A1 | 12/2009 | Dimeo, Jr. et al. |
| 2009/0313945 A1 | 12/2009 | Unruh et al. |
| 2010/0028649 A1 | 2/2010 | Trouilhet et al. |
| 2010/0029879 A1 | 2/2010 | Gosselin |
| 2010/0044907 A1 | 2/2010 | Burke et al. |
| 2010/0065206 A1 | 3/2010 | Romes |
| 2010/0072598 A1 | 3/2010 | Oh et al. |
| 2010/0109140 A1 | 5/2010 | Oh et al. |
| 2010/0117208 A1 | 5/2010 | Kim et al. |
| 2010/0129966 A1 | 5/2010 | Chen et al. |
| 2010/0144962 A1 | 6/2010 | Jana et al. |
| 2010/0181658 A1 | 7/2010 | Yamashita |
| 2010/0216919 A1 | 8/2010 | Kaytan |
| 2010/0221908 A1 | 9/2010 | Ohno |
| 2010/0265985 A1 | 10/2010 | Clark et al. |
| 2010/0266818 A1 | 10/2010 | Westwood et al. |
| 2010/0266824 A1 | 10/2010 | Westwood et al. |
| 2010/0267914 A1 | 10/2010 | Westwood et al. |
| 2010/0297416 A1 | 11/2010 | Kumar et al. |
| 2010/0310798 A1 | 12/2010 | Lasalle et al. |
| 2010/0314397 A1 | 12/2010 | Williams et al. |
| 2010/0320323 A1 | 12/2010 | Mueller et al. |
| 2010/0321878 A1 | 12/2010 | Huang |
| 2011/0020717 A1 | 1/2011 | Kaye et al. |
| 2011/0039089 A1 | 2/2011 | El Bounia et al. |
| 2011/0057346 A1 | 3/2011 | Nunn |
| 2011/0081529 A1 | 4/2011 | Richeson et al. |
| 2011/0085581 A1 | 4/2011 | Clark et al. |
| 2011/0089558 A1 | 4/2011 | Muto et al. |
| 2011/0090933 A1 | 4/2011 | Gibbs et al. |
| 2011/0109120 A1 | 5/2011 | Bonerb |
| 2011/0114513 A1 | 5/2011 | Miller |
| 2011/0140143 A1 | 6/2011 | Kim et al. |
| 2011/0180490 A1 | 7/2011 | Gosselin |
| 2011/0209780 A1 | 9/2011 | Gantenbein et al. |
| 2011/0210442 A1 | 9/2011 | Lim et al. |
| 2011/0219716 A1 | 9/2011 | Chen |
| 2011/0221546 A1 | 9/2011 | Yamaji et al. |
| 2011/0233795 A1 | 9/2011 | Kim et al. |

(56) References Cited

U.S. PATENT DOCUMENTS

| | | |
|---|---|---|
| 2011/0248374 A1 | 10/2011 | Akin et al. |
| 2011/0274901 A1 | 11/2011 | Ronzani |
| 2011/0287584 A1 | 11/2011 | Suh et al. |
| 2012/0013016 A1 | 1/2012 | Oh et al. |
| 2012/0118495 A1 | 5/2012 | Jung et al. |
| 2012/0135169 A1 | 5/2012 | Tangelder et al. |
| 2012/0139090 A1 | 6/2012 | Kim et al. |
| 2012/0145568 A1* | 6/2012 | Collison ............... B65D 27/16 206/204 |
| 2012/0146503 A1 | 6/2012 | Negley et al. |
| 2012/0273947 A1 | 11/2012 | Mo |
| 2012/0299169 A1 | 11/2012 | Kim et al. |
| 2012/0299199 A1 | 11/2012 | Kim et al. |
| 2013/0011647 A1 | 1/2013 | Handa et al. |
| 2013/0011648 A1 | 1/2013 | Handa et al. |
| 2013/0020434 A1 | 1/2013 | Muller et al. |
| 2013/0028651 A1 | 1/2013 | Oh et al. |
| 2013/0040125 A1 | 2/2013 | Eberstaller et al. |
| 2013/0059938 A1 | 3/2013 | Paetz-Lauter et al. |
| 2013/0122255 A1 | 5/2013 | Chen |
| 2013/0170175 A1 | 7/2013 | Negley et al. |
| 2013/0170176 A1 | 7/2013 | Athalye |
| 2013/0221012 A1 | 8/2013 | Cole et al. |
| 2013/0310829 A1 | 11/2013 | Cohen |
| 2013/0317238 A1 | 11/2013 | Mohanty et al. |
| 2014/0023819 A1 | 1/2014 | Pritchard |
| 2014/0034756 A1 | 2/2014 | Gantenbein et al. |
| 2014/0043804 A1 | 2/2014 | Negley et al. |
| 2014/0048560 A1 | 2/2014 | Bina et al. |
| 2014/0084045 A1 | 3/2014 | Yang et al. |
| 2014/0087109 A1 | 3/2014 | Huang et al. |
| 2014/0107240 A1 | 4/2014 | Donnelly |
| 2014/0127430 A1 | 5/2014 | Deno et al. |
| 2014/0187658 A1 | 7/2014 | Handa et al. |
| 2014/0197548 A1 | 7/2014 | Do et al. |
| 2014/0275301 A1 | 9/2014 | Ahmed et al. |
| 2014/0276494 A1 | 9/2014 | Cisko et al. |
| 2014/0285208 A1 | 9/2014 | Mizuta et al. |
| 2014/0332946 A1 | 11/2014 | Oh et al. |
| 2014/0336319 A1 | 11/2014 | Kim et al. |
| 2014/0339320 A1 | 11/2014 | Gantenbein et al. |
| 2014/0339327 A1 | 11/2014 | Gantenbein et al. |
| 2014/0361662 A1 | 12/2014 | Al Ahmad et al. |
| 2014/0364663 A1 | 12/2014 | Ramesh |
| 2014/0371055 A1 | 12/2014 | Ramesh |
| 2015/0024545 A1 | 1/2015 | Kim et al. |
| 2015/0135620 A1 | 5/2015 | Collison |
| 2015/0151508 A1 | 6/2015 | Planchard |
| 2015/0158656 A1* | 6/2015 | McKinnon ............... B31B 3/14 220/592.2 |
| 2015/0166244 A1 | 6/2015 | Wood et al. |
| 2015/0168329 A1 | 6/2015 | Gunness |
| 2015/0191291 A1 | 7/2015 | Wood et al. |
| 2015/0225526 A1 | 8/2015 | Tu et al. |
| 2015/0225538 A1 | 8/2015 | Kim et al. |
| 2015/0255499 A1 | 9/2015 | Lee et al. |
| 2015/0273741 A1 | 10/2015 | Burke et al. |
| 2015/0287673 A1 | 10/2015 | Lim et al. |
| 2015/0330576 A1 | 11/2015 | Zhai et al. |
| 2015/0340300 A1 | 11/2015 | Shiramizu et al. |
| 2015/0367985 A1 | 12/2015 | Duisters et al. |
| 2015/0373849 A1 | 12/2015 | Huang et al. |
| 2015/0377363 A1 | 12/2015 | Collison et al. |
| 2016/0039990 A1 | 2/2016 | Park et al. |
| 2016/0045841 A1 | 2/2016 | Kaplan et al. |
| 2016/0056358 A1 | 2/2016 | Moosburger |
| 2016/0060412 A1 | 3/2016 | Barrette |
| 2016/0074886 A1 | 3/2016 | Gantenbein et al. |
| 2016/0082667 A1 | 3/2016 | Donderici |
| 2016/0272664 A1 | 10/2016 | Cohen |
| 2017/0369226 A1* | 12/2017 | Chase ............... B65D 81/3848 |

OTHER PUBLICATIONS

Thermopod, ThermoPod Protective Packaging ThermoKeeper insulated protective packaging, www.mhpn.com/product/thermokeeper_insulated_protective_packaging/packaging.

Thermopod, Patent and Trademarks, www.thermopodllc.com/patents.html.

Thermopod search resulting in 5 results.

Thermal Packaging Products, Temperature Controlled Packaging, www.thermomailer.com.

* cited by examiner

PACKAGING INSULATION PRODUCTS AND METHODS OF MAKING AND USING SAME

FIELD OF THE INVENTION

The present invention relates to the field of packaging insulation.

PRIOR ART

Packaging insulation is used for shipping perishable items which must be kept cold during shipping. Individualized packages in which such items are shipped are lined with insulation to maintain the shipped item or items at the appropriate temperature. Current packaging insulation products comprise semi rigid expanded styrene panels, polymer bags stuffed with cotton, or Kraft paper bags stuffed with cotton.

SUMMARY OF THE INVENTION

The present invention comprises packaging insulation for insertion into a packaging container, which includes an air laid natural fibrous batt comprised primarily of natural fibers, having foldable paper sheet material adhered to both sides of the batt. The resulting method and product provides packaging insulation which can be shipped flat and compressed, which expands when unpacked and which can be readily folded to match the interior configuration of a shipping container, such as a cardboard box.

These and other features, advantages and objects of the invention will be more readily understood and appreciated by reference to the drawings, description of the preferred embodiments, and claims.

DESCRIPTION OF THE PREFERRED EMBODIMENTS

Figure 1:
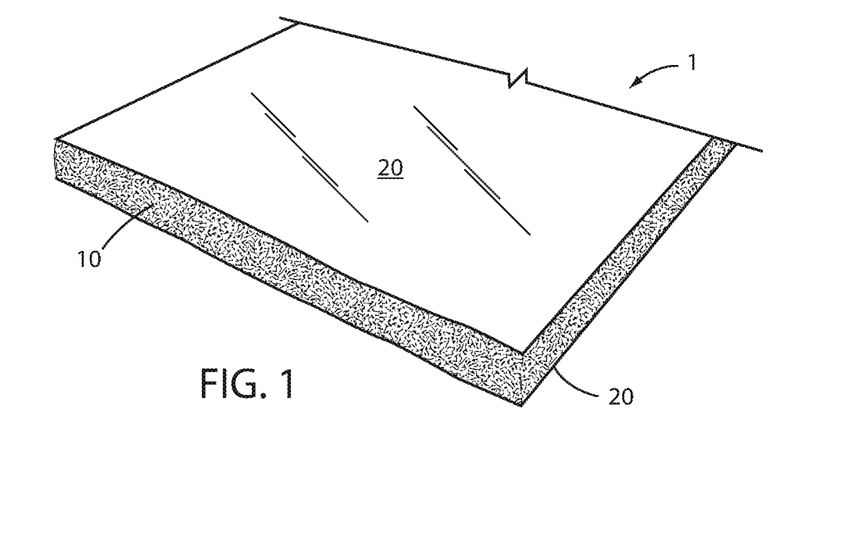
FIG. 1 is a perspective view of a preferred embodiment packaging insulation.
Figure 2:
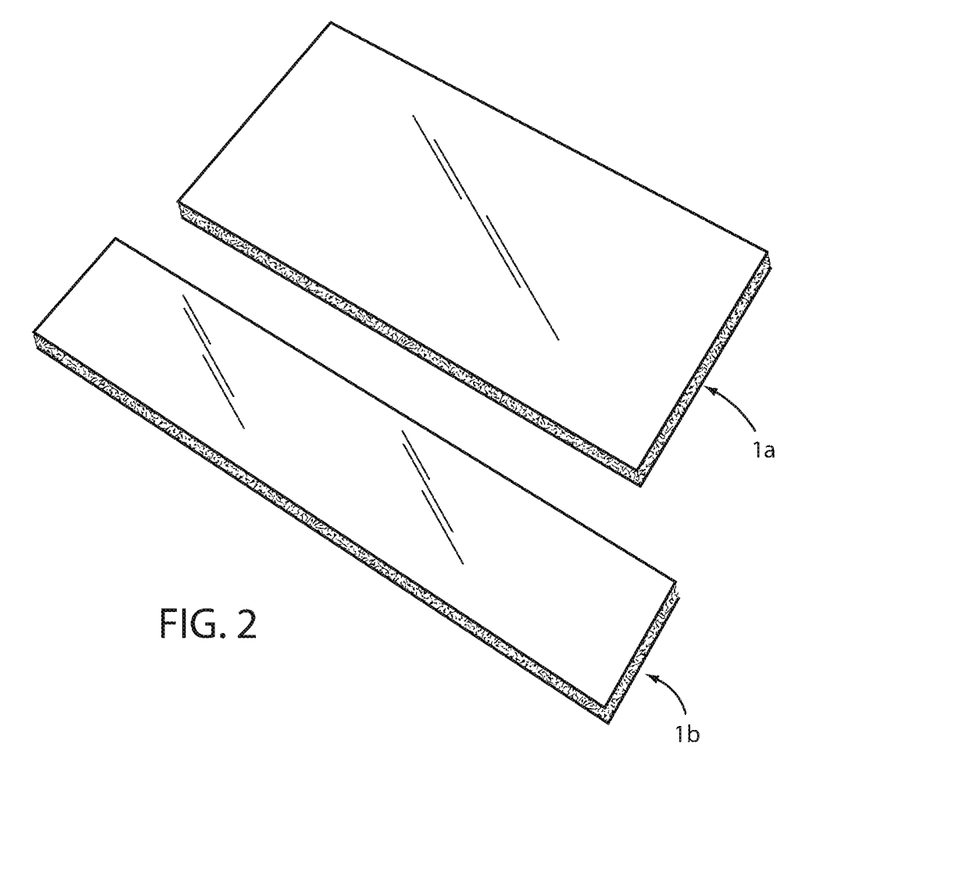
FIG. 2 is a perspective view of two pieces of packaging insulation cut to fit within a particular shipping container.
Figure 3:
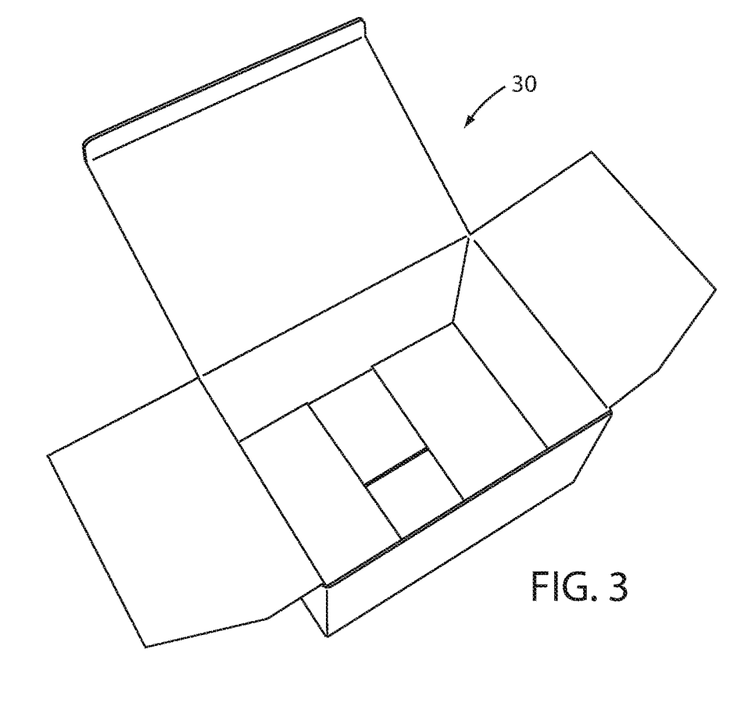
FIG. 3 is a perspective view of a cardboard shipping container without packaging insulation.
Figure 4:
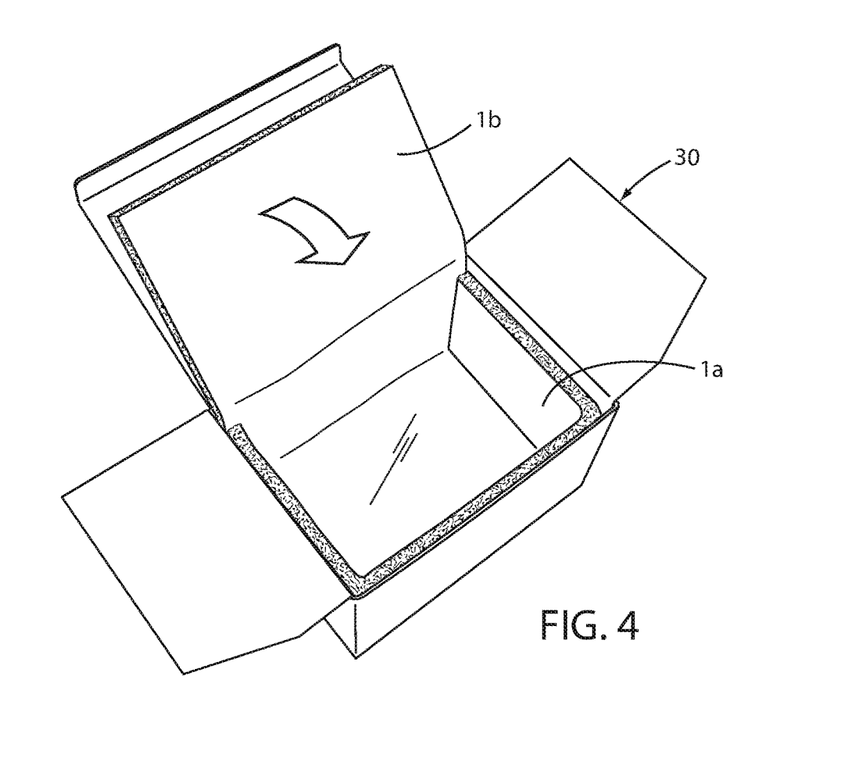
FIG. 4 is a perspective view of the container of FIG. 3 lined with the packaging insulation pieces of FIG. 2.

In the preferred embodiment laminated packaging insulation 1 comprises an air laid natural fiber batt 10, laminated between two layers of paper sheet material 20 (FIG. 1). FIG. 2 shows a sheet of the packaging insulation 1 which has been cut into pieces 1*a* and 1*b* to fit within the cardboard shipping container 30 of FIG. 3. Packaging insulation 1 is readily foldable into appropriate shipping container configurations. As shown in FIG. 4, piece 1*b* has been folded to cover the bottom, one side and the lid of container 30. Piece 1*a* has been folded to cover the remaining three sides of container 30.

The air laid natural fiber batt 10 is formed of natural fibers, preferably cotton fibers, and most preferably recycled cotton fibers. The lengths of the fibers are irregular, but substantially fall between about 1 to about 30 mm. The denier of the recycled cotton fibers is similarly irregular, but substantially falls between about 1 to about 30. From about 5 to about 30% thermoplastic binder fiber, more preferably about 10-25%, and most preferably about 15-20%, is mixed in with the natural fibers. Binder fibers typically comprise a higher melting point thermoplastic core fiber, encased in a lower melting point thermoplastic sheath.

The paper sheet material used preferably Kraft paper at a thickness of about 1 to about 10 mils, more preferably about 2 to about 6 mils, and most preferably about 4 mils. From about 20 to about 60# Kraft Paper, more preferably about 30# to about 40#, and most preferably about 35#, is preferred. The presence of the binder fibers in batt 10 may be sufficient to adhere the Kraft paper 20 to batt 10 during the heating, compression and cooling process described below. However, the Kraft paper is preferably coated with a low density polyethylene (LDPE) or high density polyethylene coating (HDPE), which becomes tacky and adhering on heating. The paper may have an HDPE or LDPE coating on both sides, to enhance its impermeability to moisture.

The natural fibers are normally shipped in bales, which are "opened" using a bale opening machine and process, which separates the fibers. They are mixed with the binder fibers and delivered by the flow of air into an air lay machine that forms a continuous batt and delivers it to a continuously moving conveyor belt. The fibers will be air laid to a thickness which is appropriate to the final thickness desired. The fibers will be air laid to a thickness which is greater than, but appropriate to the final thickness desired. A batt as air laid on the conveyor may vary widely, but from about 3 to about 6 inch thicknesses are typical. The batt is conveyed through an oven at a temperature of about 175° C. to about 195° C., typically about 180 to 185° C. The heat of the oven tackifies the sheath of the binder fibers to assist in binding the natural and binder fibers together and give the batt cohesion.

Figure 5:
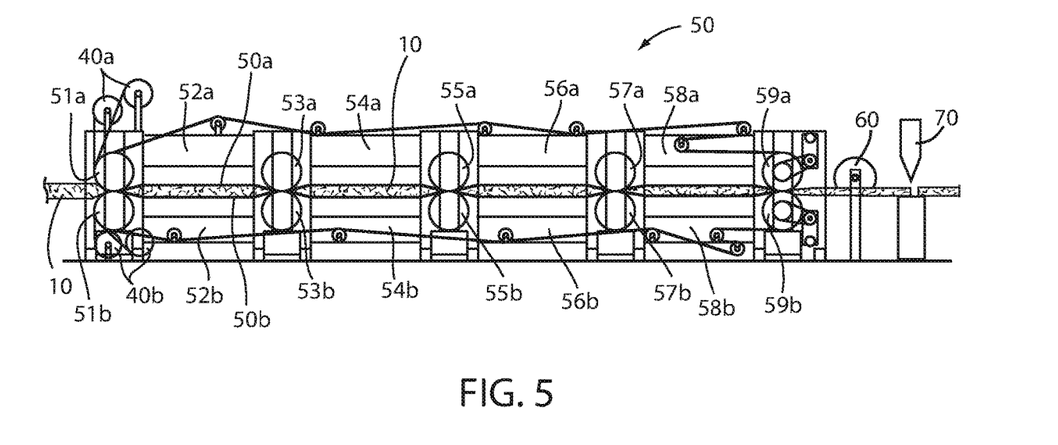
FIG. 5 is a plan view of the compression equipment used to form the packaging insulation of the preferred embodiment.
Figure 6:
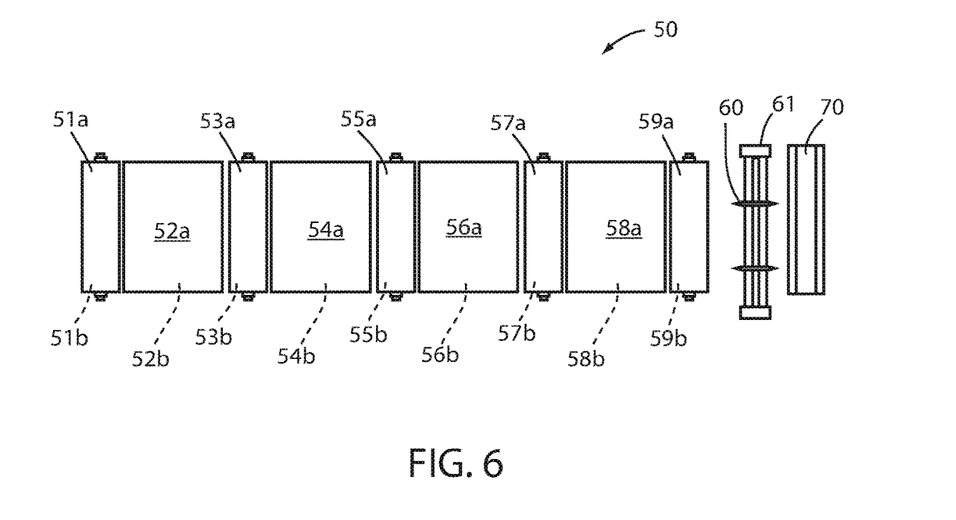
FIG. 6 is a top plan view of the compression equipment.

From the oven, the batt is conveyed along to compressor 50 (FIGS. 5 and 6). Compressor 50 comprises a series of upper and lower compression rollers 51*a-b*, 53*a-b*, 55*a-b*, 57*a-b* and 59*a-b* which respectively carry a conveyor belt 50*a* and 50*b*, made of a low friction material such as Teflon. Located between the compression rollers, are compression plates 52*a-b*, 54*a-b*, 56*a-b* and 58*a-b*, which press against the upper and lower Teflon conveyor belts 50*a* and 50*b*. The Teflon conveyor belts 50*a* and 50*b* slide over and past the compression plates.

As fibrous batt 10 is fed between the upper and lower Teflon conveyor belts 50*a* and 50*b*, at upper and lower starter rolls 51*a* and 51*b*, the PET film facing stock is fed from one of the upper rolls 40*a* under the upper Teflon conveyor belt 50*a* at top roll 51*a* and from one of the lower rolls 40*b* over the lower Teflon conveyor belt 50*b* at bottom roll 51*b* so as to be applied to both opposite sides of the passing fibrous batt 10 (FIG. 5). Two separate top feed stock rolls 40*a* can carry the same full width paper rolls and used in the alternative, or can carry paper rolls of two different widths and used in the alternative, or can carry two narrower paper rolls and used simultaneously to feed two side by side rolls of paper, which overlap slightly during the lamination process. The same is true for the two separate bottom feed stock rolls 40*b*.

The batt continues to pass between the upper and lower Teflon conveyor belts, carried by alternating upper and lower compression rollers and compression plates, which gradually reduce the thickness of the laminated batt to the target thickness. Compression rolls 51*a-b*, and 53*a-b* are heated to from about 170° C. to about 190° C., while rolls 55a-b, 57a-b and 59a-b are cooled to about 40° F. to about 55° F. Similarly, compression plates 52a-b and 54a-b are heated to from about 170° C. to about 190° C., while plates 56a-b and 58a-b are cooled to about 40° F. to about 55° F. In this manner, binding fibers in the fibrous batt continue to be adhering and tacky, and the LDPE on the paper stock becomes heated and tacky, through the heated compression rollers and heated compression plates. When the batt reaches the cooling rollers and cooling compression plates, the heated and tacky binder fabrics and the LDPE on the paper stock begin to solidify and complete the adherence process, both between fibers in the batt, and between the batt and the paper laminated to each opposing face of the bait.

As the laminated batt passes the final compression rolls 59a and 59b, it passes through longitudinal cutters 60 adjustably mounted on a support 61. This cuts the batt to desired widths. The batt so cut then passes a guillotine cutter blade 70 which cross-cuts the batt to desired lengths.

The resulting packaging insulation products 1 are cut to desired dimensions for specific packaging insulation requirements, and are from about ¼ to about 3 inches thick, and have a density of from about one to about seven pounds per cubic foot. The packaging insulation products can be shipped flat and compressed for economy of shipment. When they are unpacked at the customer's location, they expand back to at least near their original thickness, and can be folded to fit the packaging container in which product is to be shipped. Preferably, two panels are provided for each package (FIG. 2), one of which can be folded to cover the bottom, rear side and top of the container, and the other of which can be folded to cover the two ends and front side of the container (FIGS. 3 and 4).

Of course it is understood that the above are preferred embodiments of the invention, and that various changes and alterations can be made without departing from the spirit and scope of the invention, as set forth in the appended claims.

The invention claimed is:

1. A method for insulating packaging containers comprising: providing a flat laminated packaging insulation which is of uniform thickness, resiliently compressible and foldable, cut to size for locating in a packaging container, said packaging insulation comprising an air laid natural fibrous batt comprised primarily of natural fibers, said batt being of uniform thickness, resiliently compressible and foldable, and having foldable paper sheet material adhered to both sides of said batt to form a laminate which can be folded without the need for creases, grooves or cut lines in said laminate to facilitate folding, whereby said laminated packaging insulation can be manufactured, compressed and shipped as a flat panel of uniform thickness, and allowed to resiliently expand and be folded for insertion into a packaging container.

2. The method of claim 1 wherein said natural fibrous batt includes from about 5 to about 30% thermoplastic binder fibers mixed with and adhered to at least some of said natural fibers.

3. The method of claim 2 in which said natural fibers of said fibrous batt are recycled cotton fibers.

4. The method of claim 3 in which said natural fibers have lengths of between about 1 to about 30 mm.

5. The method of claim 4 in which the denier of said natural fibers is between about 1 to about 30.

6. The method of claim 5 in which said paper sheet material is from about 20 to about 60# Kraft paper, having a thickness of about 1 to about 10 mils, and is coated on its adhering side with a low density polyethylene (LDPE) coating, which becomes tacky and adhering on heating.

7. The method of claim 6 in which said paper sheet material is from about 30# to about 40# Kraft paper having a thickness of from about 2 to about 6 mils.

8. The method of claim 7 in which said paper is coated with said LDPE coating on both sides.

9. The method of claim 8 in which said thermoplastic binder fibers comprise from about 10 to about 25% of said fibers in said batt.

10. The method of claim 1 in which said laminated packaging insulation is shipped flat and compressed for economy of shipment, and for folding to fit its intended packaging container when provided to a customer for use as packaging insulation.

11. The method of claim 10 in which two separate ones of said flat panels of said laminated packaging insulation are provided for said package container, said package container having a bottom, rear side, front side and two end sides and a top, such that one of said flat panels can be folded to cover said bottom, rear side and top of the container, and the other of which can be folded to cover said two ends and front side of the container.

12. The method of claim 10 wherein said natural fibrous batt includes from about 5 to about 30% thermoplastic binder fibers mixed with and adhered to at least some of said natural fibers, and said natural fibers of said fibrous batt are recycled cotton fibers; said binder fibers comprising a higher melting point thermoplastic core fiber, encased in a lower melting point thermoplastic sheath.

13. The method of claim 12 in which said natural fibers have lengths of between about 1 to about 30 mm.

14. The method of claim 13 in which the denier of said natural fibers is between about 1 to about 30.

15. The method of claim 13 in which said paper sheet material is from about 20 to about 60# Kraft paper, having a thickness of about 1 to about 10 mils, and is coated on its adhering side with a low density polyethylene (LDPE) coating, which becomes tacky and adhering on heating.

16. The method of claim 15 in which two separate ones of said flat panels of said laminated packaging insulation are provided for said package container, said package container having a bottom, rear side, front side and two end sides and a top, such that one of said flat panels can be folded to cover said bottom, rear side and top of the container, and the other of which can be folded to cover said two ends and front side of the container.

17. A package insulation material comprising: a flat laminated packaging insulation which is of uniform thickness, resiliently compressible and foldable, cut to size for locating in a packaging container, said packaging insulation comprising an air laid natural fibrous batt comprised primarily of natural fibers, said batt being of uniform thickness, resiliently compressible and foldable, and having foldable paper sheet material adhered to both sides of said batt to form a laminate which can be folded without the need for creases, grooves or cut lines in said laminate to facilitate folding, whereby said laminated packaging insulation can be manufactured, compressed and shipped as a flat panel of uniform thickness, and allowed to resiliently expand and be folded for insertion into a packaging container.

18. The package insulation material of claim 17 wherein said natural fibrous batt includes from about 5 to about 30% thermoplastic binder fibers mixed with and adhered to at least some of said natural fibers; said natural fibers of said fibrous batt being recycled cotton fibers having lengths of between about 1 to about 30 mm, and a denier of between about 1 to about 30; said paper sheet material being from about 20 to about 60# Kraft paper, having a thickness of about 1 to about 10 mils, and is coated on its adhering side with a low density polyethylene (LDPE) coating, which becomes tacky and adhering on heating.

19. The package insulation material of claim 18 comprising two separate ones of said flat panels of said laminated packaging insulation are provided for said package container, said package container having a bottom, rear side, front side and two end sides and a top, such that one of said flat panels, can be folded to cover said bottom, rear side and top of the container, and the other of which can be folded to cover said two ends and front side of the container.

20. A product shipping combination comprising: a packaging container; a flat laminated packaging insulation which is of uniform thickness, resiliently compressible and foldable, being cut to size for folding and locating in said packaging container; said packaging insulation comprising an air laid natural fibrous batt comprised primarily of natural fibers, said batt being of uniform thickness, resiliently compressible and foldable, and having foldable paper sheet material adhered to both sides of said batt to form a laminate which can be folded without the need for creases, grooves or cut lines in said laminate to facilitate folding, whereby said laminated packaging insulation can be manufactured, compressed and shipped as a flat panel, and allowed to resiliently expand and be folded for insertion into said packaging container; said laminated packaging insulation being folded and inserted into said packaging container.

21. The product shipping combination of claim 20 comprising: two separate ones of said flat panels of said laminated packaging insulation are provided for said package container, said package container having a bottom, rear side, front side and two end sides and a top, such that one of said flat panels, can be folded to cover said bottom, rear side and top of the container, and the other of which can be folded to cover said two ends and front side of the container, said flat panels of said laminated packaging insulation being inserted into said packaging container, one of which is folded to cover the bottom, rear side and top of said container, and the other of which is folded to cover the two ends and front side of the container.

* * * * *